UNITED STATES PATENT OFFICE.

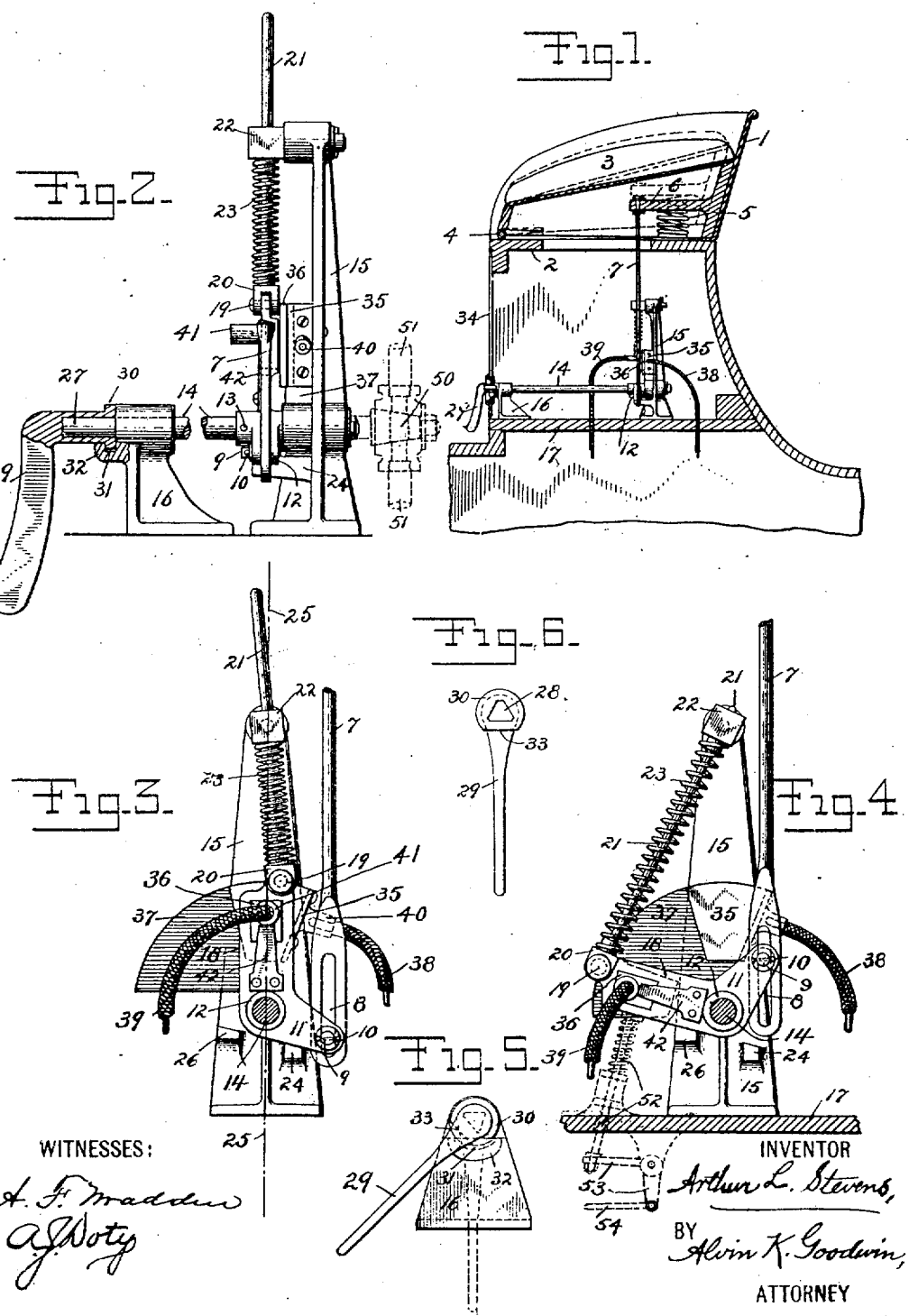

ARTHUR L. STEVENS, OF NEW YORK, N. Y.

SAFETY-STOP FOR VEHICLES.

SPECIFICATION forming part of Letters Patent No. 680,444, dated August 13, 1901.

Application filed June 4, 1900. Serial No. 19,034. (No model.)

*To all whom it may concern:*

Be it known that I, ARTHUR L. STEVENS, a citizen of the United States of America, residing at the borough of Manhattan, city of New York, State of New York, have invented certain new and useful Improvements in Safety-Stops for Vehicles, of which the following is a specification.

This invention relates to safety-stop mechanism adapted to control electric or other power used to propel automobile vehicles, and has for its principal object to provide simple, efficient, and durable devices which prevent running away of the vehicle should the motorman by accident be thrown from his place of control or should the ordinary current-controller of an electric vehicle become accidentally deranged.

A further object is to provide auxiliary devices preventing tampering with the power-applying mechanism by inquisitive or mischievous people when the motorman intentionally leaves the vehicle.

The invention consists in novel safety-stop devices so constructed and combined with a movable seat or platform operated by the weight or pressure of a motorman controlling the vehicle-propelling mechanism that said mechanism will be made inoperative when the motorman leaves the movable seat or platform either by accident or intention.

The invention also includes certain auxiliary means or mechanism whereby the propelling power can again be coupled or applied by readjusting the safety devices with a key, which is removable only when the propelling mechanism is inoperative to prevent tampering with said mechanism. This key as normally adjusted is actuated, preferably, by the motorman's foot for coupling the power-applying means when he remounts or for uncoupling and coupling said power-applying means at will during ordinary requirements or unusual emergencies of travel and independently of any operation of the movable seat or platform.

I will more particularly describe my invention as applied to an electrically-propelled vehicle having a movable or yielding seat-platform, which is depressed by the motorman occupying it and which when relieved of his weight or pressure will cut off the propelling power.

Reference is made to the accompanying drawings, forming part of this specification, in which—

Figure 1 is a vertical sectional side view of portions of the body and seat of an electric vehicle having my improved safety-stop devices. Fig. 2 is a partly-sectional side view, about one-half full size, of the safety-stop devices, with the key-shaft partly broken away and the wires removed from the opposing contacts, and indicates also by dotted lines how a rotary controlling-valve of a steam or other motor may be automatically closed to cut off the propelling power. Fig. 3 is a front view at right angles to Figs. 1 and 2 of the main parts of the mechanism omitting the key and showing normal adjustment when an electric circuit is closed. Fig. 4 is a front view of parts of Fig. 3, but with the contacts separated to break the circuit and indicates also by dotted lines how the stem of a sliding valve of a steam, gasolene, or other motor may be actuated by the tripped lever to cut off the propelling power. Fig. 5 is a front view of the key bearing and shaft with the key shown in normal locked position in full lines and in unlocked removable position in dotted lines, and Fig. 6 is an inner end or face view of the key.

Within the back 1, rising from the seat-frame 2, is placed a motorman's seat 3, which is preferably front-hinged at 4 to frame 2 and is movable upward at its rear part by suitable spring or springs 5, placed between frame 2 and a lug or projection 6 on seat 3. The motorman when occupying seat 3 lowers it, as in full lines in Fig. 1 of the drawings, and when he leaves the seat the spring 5 raises it, as indicated by dotted lines. To the seat-lug 6 is held the upper end of a rod 7, which has a slot 8 at its lower end. Through this slot passes a headed pin 9, having a securing-cotter 10 and loosely holding rod 7 to one arm 11 of a lever 12, which is fixed by a pin 13 to a shaft 14, which may turn in a standard 15 and bearing 16, preferably fastened to vehicle-body portion 17 beneath seat 3. Parts 12 14 thus always turn together. To the longer arm 18 of lever 12 is pivoted at 19 a block or stud 20, fixedly carrying a rod 21, which loosely passes through a swiveled guide 22, fitted at the head of standard 15. A normally-expanding spring 23 surrounds rod 21, and when the parts are adjusted to permit propulsion of the vehicle this spring throws and locks arm 11 of lever 12 against a stop 24 on standard 15, at which time the center pivot 19 is forward of a plane cutting the center of shaft 14 and swivel 22 and indicated by the dotted line 25 in Fig. 3 of the drawings. Another stop 26 on standard 15 limits swinging of lever 12 in the opposite direction.

The forward end 27 of shaft 14 is suitably flattened and fits a correspondingly-shaped opening 28 in the head of a key 29, which normally hangs from shaft 14 in convenient position, as in Fig. 1, to enable the motorman on seat 3 to turn the key and shaft together by his foot or heel. I prefer to make shaft portion 27 and key-opening 28 triangular in cross-section. On the key-head is formed a lip 30, part of which locks within a transverse slot 31, formed in a lug 32 on bearing 16, when the key has the normal inwardly-slanting position shown in full lines in Fig. 5 of the drawings. This lip 30 does not extend fully around the key-head, but is lacking or cut away to provide a flat face or shoulder 33, which when the key has the vertical dotted position of Fig. 5 may pass freely over the flat top of lug 32, thus permitting the key to be removed only when the power is switched or cut off from the vehicle-propelling mechanism, as hereinafter more fully explained. The shaft end 27 stands at an eyeleted opening of a seat-apron 34, which protects and conceals the mechanism under the seat while permitting operation of key 29.

For an electric vehicle I provide on standard 15 a contact 35, coöperating with an opposing contact 36, held to arm 18 of lever 12. Contact 35 is preferably screwed to an insulating wood block 37, fixed to part 15 and serving also as a guide to the movable contact 36. Wires 38 39 connect, respectively, with posts 40 41 on contacts 35 36. Contact 36 is preferably fitted in a rectangular opening of lever-arm 18 and is forced toward contact 35 and block 37 by a flat spring 42, held to said arm, as shown in Figs. 2, 3, and 4 of the drawings.

The operation is as follows: We will suppose the motorman is on seat 3, thus depressing it and holding rod 7 down to the full-line position of Figs. 1, 2, and 3. The key 29 now stands in the inclined full-line position of Fig. 5 and its lip 30 locks into bearing-lug slot 31, as in Figs. 2 and 5. Should the motorman fall from or leave the seat 3, the spring 5 instantly raises it, thereby pulling rod 7 upward. This causes the bottom of rod-slot 8 to strike pin 9 and throw lever 12 over until the center of pin 19 passes the central plane line 25, whereupon the spring 23 instantly expands and completes the full throw of lever 12 to stop 26, as shown in Fig. 4 of the drawings. This quickly separates contacts 36 35 and breaks the circuit formerly completed through wires 38 39 between the vehicle battery, controller, and motor (not shown) and prevents running away of the vehicle. The pin 9 slips upward in slot 8 of rod 7 during throw of lever 12 by spring 23. Hence a comparatively slight upward movement—say about an inch—of seat 3 to throw pivot 19 past line 25 assures full, positive, and instant separation of the contacts by spring 23, whereby dangerous sparking at the contacts is obviated. The key 29 now stands at the vertical dotted position of Fig. 5. When the same or another motorman occupies seat 3, it will again be depressed, while the slot 8 of rod 7 moves at pin 9 without hindrance. When ready to start, the motorman with his heel will throw key 29 from the dotted to the full line position of Fig. 5, which will turn shaft 14 and swing lever 12 back until the center of pivot 19 repasses plane line 25, whereupon spring 23 will throw and hold the lever to stop 24 and lock the contacts 36 35 together again to complete the circuit. The vehicle now may be electrically propelled faster or slower forward or backward, as the ordinary controller is adjusted to switch in varying currents in the well-known manner. In any sudden emergency of travel—such, for instance, as danger of collision or the sticking of the contact-cylinder of the current-controller at a place preventing cutting out of the motor—the motorman may instantly cut off the power by throwing key 29 from full-line to dotted position in Fig. 5, thereby turning shaft 14 and swinging lever 12 to separate contacts 36 35 and break the circuit, the slot 8 of rod 7 permitting upward movement of lever-pin 9 during this operation. The circuit thus may be broken and the power cut off by operating the key 29 alone and independently of any movement of the seat. When danger is past, the motorman will simply move the key 29 over again to full-line position of Fig. 5 to reëstablish the circuit.

When the motorman dismounts at a desired stopping-place, the circuit is broken and the key 29 is turned to the dotted position of Fig. 5, as above described. This always turns the key-lip 30 out of the bearing-slot 31 and brings the key-shoulder 33 parallel with and above the top of lug 32, thereby allowing the motorman to slip the key from the shaft 14 and retain it while he is away from the vehicle. The circuit now being broken at the safety-stop devices and it being quite impossible to turn the shaft 14 with the fingers, the power-applying mechanism cannot be started or be tampered with by unauthorized persons moving the controller while the motorman is absent, and it takes but a few moments for him to readjust the key to the shaft and remount to the seat and then turn the key to full-line position of Fig. 5, thereby again connecting contacts 36 35, and all now is ready for starting and regulating speed and stopping the vehicle by means of the ordinary current-controller.

Means other than the spring 23 may be used to operate the lever 12 within the scope of my invention.

It is obvious that the emergency trip device herein described is adapted for use in connection with any form of yielding platform for the motorman to sit or stand upon or press against and adapted to operate or permit operation of the emergency trip mechanism when said platform is relieved of the weight or pressure of the motorman. This operative function of the movable platform is made more valuable by the coöperating auxiliary devices including the key by which the power may either be applied or cut off and which is automatically locked against removal when the motive power is turned on and is released to permit its removal only when the power is turned off.

The parts herein marked 3 to 33, inclusive, are adapted for controlling operation of the supply-valve of a steam, gasolene, or other motor. In this case the parts 35 to 42 may be omitted. As one example, the rotary inlet-valve 50 in a motor-supply pipe 51 may be fixed to the auxiliary-mechanism shaft 14 to be closed and opened by partial rotation of the shaft, caused by rod 7 or key 29, and as will be understood from the dotted lines in Fig. 2 of the drawings. Another example is indicated by dotted lines in Fig. 4, showing how the safety-stop lever 12 when thrown over by spring 23 may strike a guided spring-pressed rod 52, which either directly or through an angle-lever 53 and rod 54 may operate the slide-valve of a motor to cut off the propelling power.

I claim as my invention—

1. In vehicle safety-stops, the combination, with a seat or platform automatically movable when relieved of the weight or pressure of the motorman controlling the vehicle, and power mechanism adapted for propelling the vehicle, of interposed means making said power mechanism inoperative when the motorman leaves the seat or platform, and auxiliary devices including a movable part of said interposed means, a key adapted to said movable part, and latch devices coöperating with said movable part and the key and permitting removal of the key only when the power mechanism is inoperative.

2. In vehicle safety-stops, the combination, with a seat or platform automatically movable when relieved of the weight or pressure of the motorman controlling the vehicle, and power mechanism adapted for propelling the vehicle, of interposed means making said power mechanism inoperative when the motorman leaves the seat or platform, and auxiliary devices including a movable part of said interposed means, a key adapted to said movable part, and latch devices coöperating with said movable part and the key and permitting removal of the key only when the power mechanism is inoperative; said key being adapted to adjust the interposed means controlling the power mechanism and render the latter operative or inoperative independently of movement of the vehicle seat or platform.

3. In vehicle safety-stops, the combination, with the power-controlling mechanism including a key to manually operate the same to turn the power on or off and removable only when the power is turned off, of an additional emergency trip automatically operative to turn off the power, substantially as set forth.

4. In vehicle safety-stops, the combination, with the power-controlling mechanism including a key to manually operate the same to turn the power on or off and removable only when the power is turned off, of an additional emergency trip operative to turn off the power, and a movable seat or platform on the vehicle constructed to operate the emergency trip when relieved of pressure, substantially as set forth.

5. A vehicle safety-stop comprising power-controlling mechanism including an operating-key to normally turn the power on or off, and devices to automatically lock the key in operative position when the power is turned on and to release it when the power is turned off, and an additional emergency trip automatically operative to turn off the power, substantially as set forth.

6. A vehicle safety-stop comprising power-controlling mechanism including an operating-key to normally turn the power on or off, and devices to automatically lock the key in operative position when the power is turned on and to release it when the power is turned off, an additional emergency trip automatically operative to turn off the power, and a movable seat or platform on the vehicle constructed to operate the emergency trip when relieved of pressure, substantially as set forth.

7. In vehicle safety-stops, the combination, with a movable seat or platform and power-applying mechanism, of a slotted rod operated by the seat or platform, a lever loosely coupled to said rod at its slot, and means actuated by movement of the lever and making said power-applying mechanism inoperative when the seat or platform is relieved of pressure.

8. In vehicle safety-stops, the combination, with a movable seat or platform and power-applying mechanism, of a slotted rod operated by the seat or platform, a spring-actuated lever loosely coupled to said rod at its slot, and means actuated by movement of the lever and making said power-applying mechanism inoperative when the seat or platform is relieved of pressure.

9. In vehicle safety-stops, the combination, with a movable seat or platform and power-applying mechanism, of a slotted rod actuated by the seat or platform, a spring-actuated lever loosely coupled to said rod at its slot, means actuated by movement of the lever and making the power-applying mechanism inoperative when the seat or platform is relieved of pressure, and stops limiting movement of the lever in both directions by the spring.

10. In vehicle safety-stops, the combination, with a movable seat or platform and power-applying mechanism, of a slotted rod operated by the seat or platform, a lever loosely coupled to said rod at its slot, means actuated by movement of the lever and making the power-applying mechanism inoperative when the seat or platform is relieved of pressure, a shaft movable with the lever, and a key adapted to said shaft and removable therefrom only when the power-applying mechanism is inoperative.

11. In vehicle safety-stops, the combination, with a movable seat or platform and power-applying mechanism, of a slotted rod operated by the seat or platform, a spring-actuated lever loosely coupled to said rod at its slot, means actuated by movement of the lever and making the power-applying mechanism inoperative when the seat or platform is relieved of pressure, a shaft movable with the lever, and a key adapted to said shaft and removable therefrom only when the power-applying mechanism is inoperative.

12. In vehicle safety-stops, the combination, with a movable seat or platform and power-applying mechanism, of a slotted rod operated by the seat or platform, a lever loosely coupled to said rod at its slot, means actuated by movement of the lever and making the power-applying mechanism inoperative when the seat or platform is relieved of pressure, a shaft movable with the lever, and a key adapted to said shaft and removable therefrom only when the power-applying mechanism is inoperative; said key also adapted to adjust said mechanism and render it operative or inoperative independently of movement of the seat or platform.

13. In vehicle safety-stops, the combination, with a movable seat or platform and power-applying mechanism, of a slotted rod operated by the seat or platform, a spring-actuated lever loosely coupled to said rod at its slot, means actuated by movement of the lever and making the power-applying mechanism inoperative when the seat or platform is relieved of pressure, a shaft movable with the lever, and a key adapted to said shaft and removable therefrom only when the power-applying mechanism is inoperative; said key also adapted to adjust said mechanism and render it operative or inoperative independently of movement of the seat or platform.

14. In vehicle safety-stops, the combination, with a movable seat or platform, relatively stationary and movable electric contacts, and circuit connections adapted to couple said contacts to a battery and motor, of a slotted rod operated by the seat or platform, and a lever loosely coupled to said rod at its slot and carrying the movable contact.

15. In vehicle safety-stops, the combination, with a movable seat or platform, relatively stationary and movable electric contacts, and circuit connections adapted to couple said contacts to a battery and motor, of a slotted rod operated by the seat or platform, and a spring-actuated lever loosely coupled to said rod at its slot and carrying the movable contact.

16. In vehicle safety-stops, the combination, with a movable seat or platform, relatively stationary and movable electric contacts, and circuit connections adapted to couple said contacts to a battery and motor, of a slotted rod operated by the seat or platform, a spring-actuated lever loosely coupled to said rod at its slot and carrying the movable contact, and stops limiting movement of the lever in both directions by the spring.

17. In vehicle safety-stops, the combination, with a movable seat or platform, a rod 7 operated thereby and having a slot 8, a standard, a lever fulcrumed to said standard and coupled by pin 9 to rod 7 at its slot 8, a block 20 pivoted at 19 to the lever and having a pin 21, a guide 22 for pin 21 swiveled to the standard, a spring 23 on rod 21 between parts 20, 22, and means operated by the spring-actuated lever for making the power-applying mechanism inoperative when the seat or platform is relieved of pressure.

18. In vehicle safety-stops, the combination, with a movable seat or platform, a rod 7 operated thereby and having slot 8, a standard, a lever fulcrumed to said standard and coupled by pin 9 to rod 7 at its slot 8, a block 20 pivoted at 19 to the lever and having a pin 21, a guide 22 for pin 21 swiveled to the standard, a spring 23 on rod 21 between parts 20, 22, electric contacts 35, 36 on the standard and lever respectively, and wires 38, 39 adapted to couple said contacts to the vehicle battery and motor.

19. In vehicle safety-stops, the combination, with a movable seat or platform and power-applying mechanism, of a rod operated by the seat or platform, bearings, a shaft rocking in said bearings, a lever fixed to the shaft, means coupling said lever to the seat-rod, means actuated by the lever and making the power-applying mechanism inoperative when the seat or platform is relieved of pressure, a removable key adapted to the lever-shaft to turn it or be turned by it and having a lip adapted to a slot of the shaft-bearing and also having a portion adapted to slip over or past said bearing when the lip is disengaged from the bearing-slot as the power-applying mechanism is made inoperative.

20. In vehicle safety-stops, the combination, with power-applying mechanism, bearings, a shaft journaled in said bearings, and a lever turning with the shaft and adapted to make the power mechanism operative or inoperative, of a key adapted to turn the shaft or be turned by it and having a lip 30 and shoulder 33; the adjacent shaft-bearing having a lug 32 provided with slot 31 to which the key-lip 30 is adapted for locking the key to the shaft when the power mechanism is operative and permitting removal of the key only when the power mechanism is inoperative.

ARTHUR L. STEVENS.

Witnesses:
A. F. MADDEN,
A. J. DOTY.